(12) United States Patent
Akhtar et al.

(10) Patent No.: US 7,948,937 B2
(45) Date of Patent: May 24, 2011

(54) FAST CALL SETUP METHOD

(75) Inventors: Haseeb Akhtar, Garland, TX (US);
Azeem Ahmad, Allen, TX (US)

(73) Assignee: Ericsson AB, Stockholm (SE)

( * ) Notice: Subject to any disclaimer, the term of this patent is extended or adjusted under 35 U.S.C. 154(b) by 636 days.

(21) Appl. No.: 10/590,920

(22) PCT Filed: Feb. 24, 2005

(86) PCT No.: PCT/US2005/006291
§ 371 (c)(1),
(2), (4) Date: Aug. 25, 2006

(87) PCT Pub. No.: WO2005/086501
PCT Pub. Date: Sep. 15, 2005

(65) Prior Publication Data
US 2007/0140252 A1    Jun. 21, 2007

Related U.S. Application Data

(60) Provisional application No. 60/548,478, filed on Feb. 27, 2004.

(51) Int. Cl.
*H04W 4/00* (2009.01)

(52) U.S. Cl. .................................................. 370/329
(58) Field of Classification Search .......... 370/328–347;
455/450–455, 509–515
See application file for complete search history.

(56) References Cited

U.S. PATENT DOCUMENTS
2003/0135626 A1   7/2003   Ray et al.
2003/0145091 A1   7/2003   Peng et al.

*Primary Examiner* — Thai D Hoang
(74) *Attorney, Agent, or Firm* — Coats & Bennett, P.L.L.C.

(57) ABSTRACT

In according with the teachings of the present invention, a method and apparatus for performing fast call set-up in a wireless network is presented (FIG. 2). A number of efficiencies are implemented to diminish the time required for establishing a call in a packet-based network. For example, call initiation (224) and Base Station Subsystem (BSS-202) resource allocation are performed contemporaneously; radio Link resources and packet resources are initiated contemporaneously (242-244); an A10 interface is established immediately after allocating and connecting packet control function (PCF) resources for a packet data session (246); and a service connection request (254) is performed immediately after a channel assignment process (250) is performed.

21 Claims, 4 Drawing Sheets

Fig. 1A

PRIOR ART

Fig. 1B

PRIOR ART

FAST CALL SETUP METHOD

CROSS REFERENCE TO RELATED APPLICATION(S)

This application claims the benefit of priority under 35 U.S.C. §119(e) of United States Provisional Application No. 60/548,478 filed Feb. 27, 2004 and which is incorporated herein by reference.

BACKGROUND OF THE INVENTION

1. Field of the Invention

This invention relates to communications. Specifically, the setup of a communication call.

2. Description of the Prior Art

Conventional communications networks often include packet-switched technology. Although circuit-switched networks were implemented first, they are an older more traditional technology. Packet-switched networks are newer more flexible networks. A wide variety of new applications are being implemented to take advantage of the flexibility of these packet-switched networks.

In a packet-switched network, packets may take a variety of different paths to arrive at a given destination. A message is first fragmented into packets, communicated across a network, and then combined back into the original message. Since the packets do not all take the same path, packet-switched networks have gained wide acceptance. For example, if a link goes down on a path, the packets can all be re-routed and still reach their destination with minimal effort.

In general, packet-switched networks are being widely deployed and will continue to be widely deployed in the foreseeable future. However, packet-switched networks are not without their problems and the advent of new technologies and applications highlight some of these problems. For example, one of the slower aspects of a packet-switched communication session is the initial setup of the call. In addition, in many applications, such as push-to-talk, etc., there are times when a full circuit is not required, but instead there is a need to transmit just a few bits. Unfortunately, conventional packet-switched technologies and protocols were not initially designed for these types of applications and, as such, perform poorly when these applications are implemented.

Figure 1A:
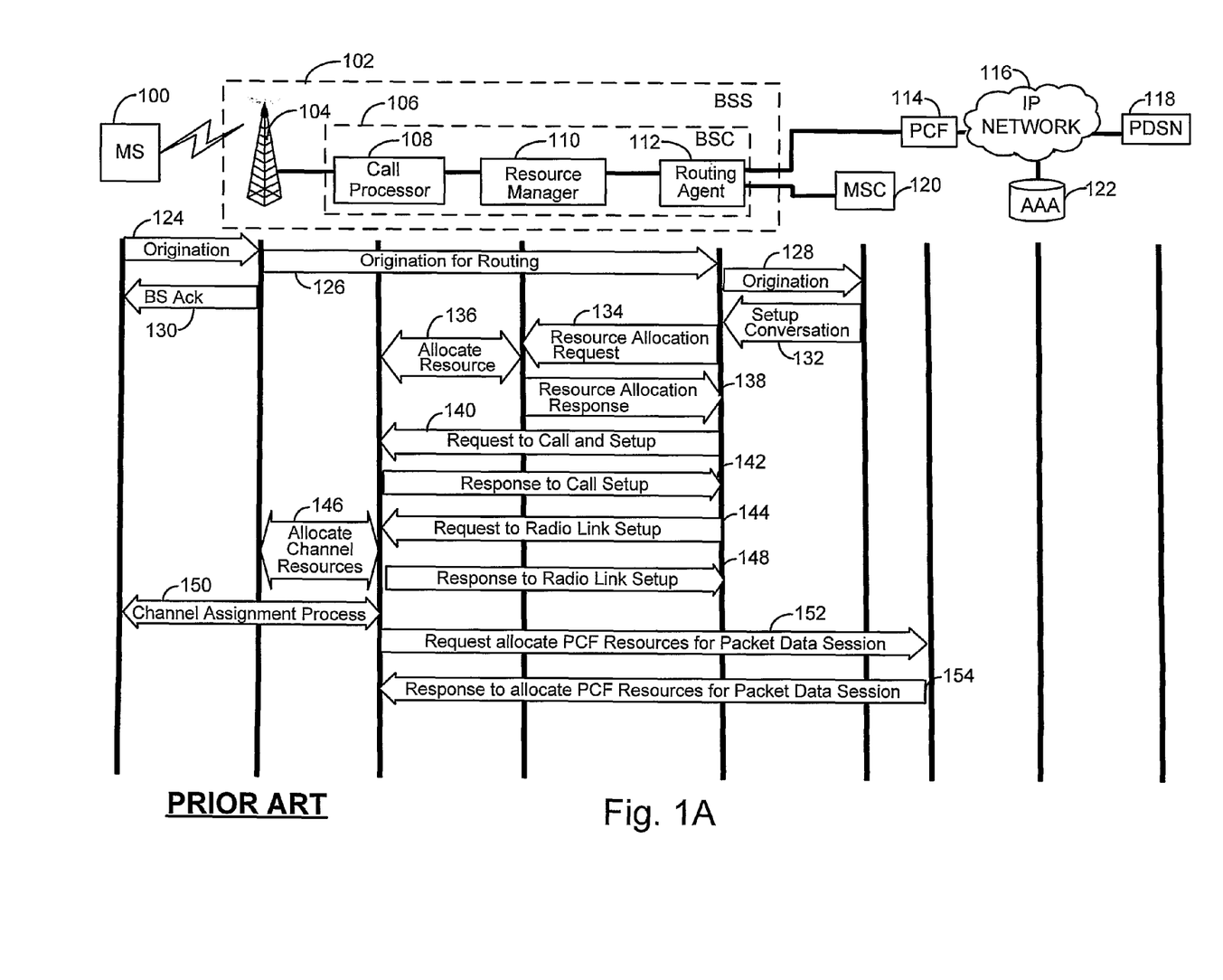
FIG. 1A displays a conventional message process flow diagram.
Figure 1B:
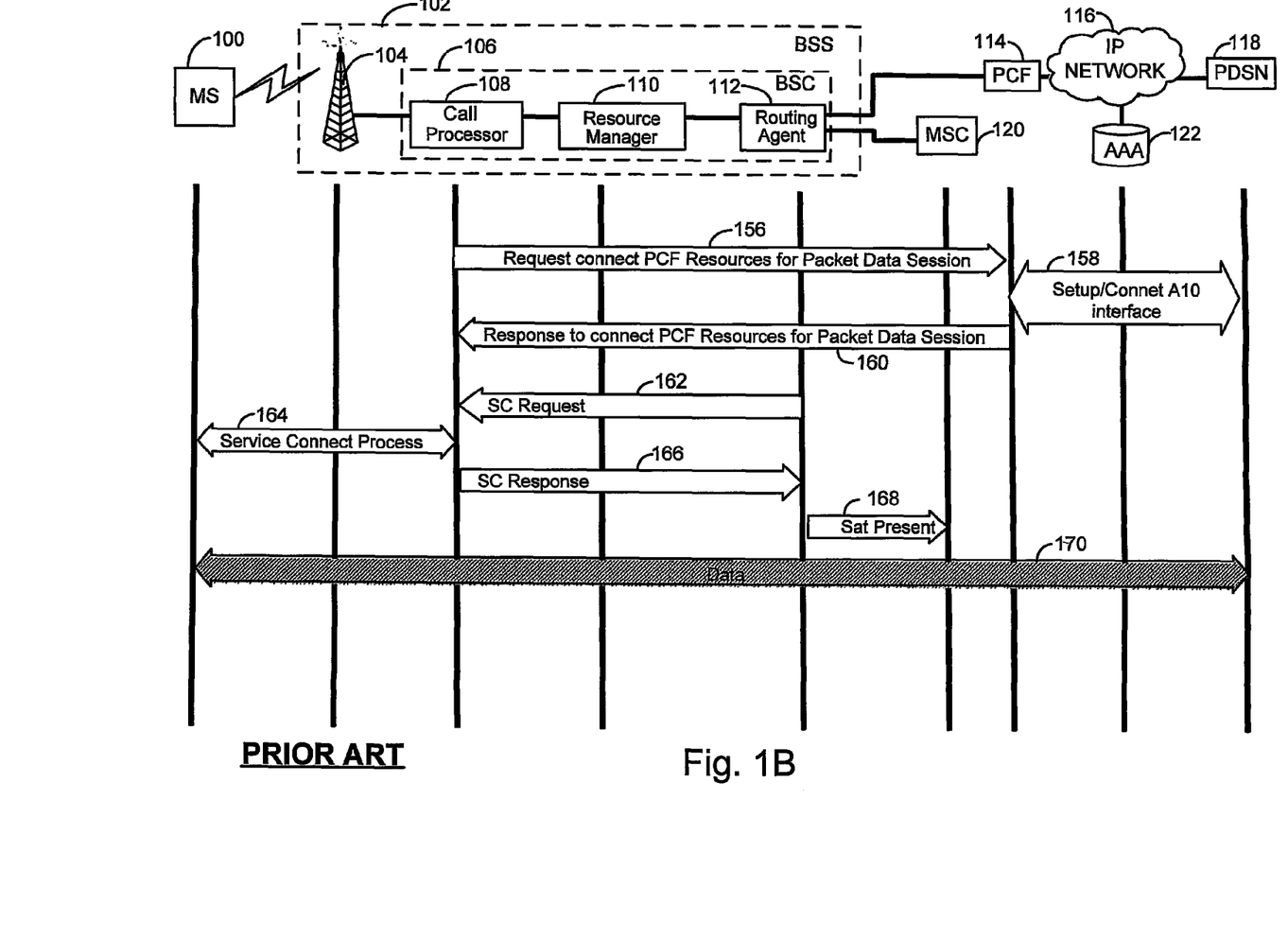
FIG. 1B displays a continuation of the conventional message process flow diagram shown in FIG. 1A.

An example of a conventional implementation of a packet-based network will be shown in Fig. 1A and FIG. 1B. Fig. 1A displays a conventional message process flow diagram. In FIG. 1A, a Mobile Station (MS) 100 is shown. The MS 100 is in communication with a Base Station Subsystem (BSS) 102. The BSS 102 includes a Base Transceiver Station (BTS) 104 that is in communication with a Base Station Controller (BSC) 106. The BSC 106 also includes a Call Processor (CP) 108, a Resource Manager (RM) 110, and a Routing Agent (RA) 112. The RA 112 is in communication with an MSC 120 and a Packet Control Function (PCF) 114. The BSC 106 communicates with a Mobile Switching Center (MSC) 120 and a PCF 114. The PCF 114 is in communication with an IP network 116. An Authentication, Authorization, and Accounting (AAA) server 122 may be accessed through the IP network 116. A PDSN 118 is also in communication with the IP network 116.

In a conventional system, the MS 100 generates and sends an origination message 124 to the BTS 104. Origination for routing 126 is performed between the BTS 104 and the RA 112. The BTS 104 sends a base station acknowledgment message (BS Ack) 130 to the MS 100 indicating that the origination message 124 has been received. The RA 112 communicates the origination 128 to the Mobile Switching Center (MSC) 120. The MSC 120 conducts a setup conversation 132 with the RA 112. The RA 112 communicates a resource allocation request 134 to the RM 110. The RM 110 and the CP 108 allocate resources as shown by 136. The RM 110 sends a resource allocation response 138 to the RA 112. The RA 112 communicates a request for call setup 140 to the CP 108. The CP 108 communicates a response to the call setup 142. The RA 112 communicates a request to radio link setup 144 to the CP 108. The CP 108 and the BTS 104 allocate channel resources as shown by 146. The CP 108 generates a response to radio link setup 148. A channel assignment process 150 is performed between the CP 108 and the MS 100. The CP 108 communicates with the Packet Control Function (PCF) 114 to allocate PCF resources for packet data session 152. The PCF 114 communicates a response to allocate PCF resources for packet data session 154 with the CP 108.

FIG. 1B displays a continuation of the conventional message process flow diagram shown in FIG. 1A. In FIG. 1B, the CP 108 communicates with the PCF 114 to request connect PCF resources for packet data session 156. The PCF 114 communicates with the Packet Data Service Node (PDSN) 118 to setup/connect an A10 interface 158. The PCF 114 communicates with the CP 108 to connect PCF resources for packet data session 160. The RA 112 sends a Service Connect (SC) request 162 to the CP 108. The CP 108 and the MS 100 perform a service connection/negotiation process 164. The CP 108 sends a service connection response 166 to the RA 112. The RA 112 sends a Sat present message 168 to the MSC 120 and, as a result of the foregoing, data 170 may be communicated between the MS 100 and the PDSN 118.

It is clear from the foregoing process flow diagram that a number of steps must be accomplished to setup a call in a packet-based network. The various steps require time to setup the call. In addition, many of the steps are required before other steps can be accomplished. The foregoing process results in more cost for the operating network, dissatisfied customers because of the user delay, and ultimately, may even limit the types of applications that can be implemented in the network.

Thus, there is a need for reducing the time for call setup in a packet-switched network. In addition, there is a need for methods that facilitate the efficient operation of packet-switched networks.

SUMMARY OF THE INVENTION

A method and apparatus is presented that decreases the call setup time for packet-based applications, such as Push-To-Talk (PTT), Voice-over-IP (VoIP), etc. In one embodiment, the call setup time is decreased by enhancing the interface between an MS and BSS.

In accordance with the teachings of the present invention, the call setup time in a packet network is decreased by performing contemporaneous process execution within a BSS for delay-sensitive packet-based applications, such as PTT and VoIP. In one embodiment, call origination is processed at the same time as the resource allocation in the BSS. In a first embodiment, call origination is processed during user authentication. In a second embodiment, radio link resources and packet resources are allocated at the same time. In a third embodiment, a service connection and/or service negotiation process are performed directly after a channel assignment process. In a fourth embodiment, service connection and/or service negotiation processes are eliminated after a channel assignment process.

In accordance with the teachings of the present invention, multiple steps are combined into a single step within the BSS as a part of a call setup process for allocating a traffic channel to the MS. In accordance with the teachings of the present invention, packet-based applications are identified and/or remembered and, as such, receive special treatment in the wireless access network so that the MS allocates a traffic channel at the earliest possible time. In an example a unique service option is assigned to a delay-sensitive packet-based applications (such as PTT or VoIP). This service option may be included by the MS in the origination message so that the network may provide a fast call setup service for this specific delay-sensitive packet-based applications (such as PTT or VoIP).

A method of operating a base station subsystem, comprises the steps of processing a call initiation request; and contemporaneously, allocating resources within the base station subsystem needed to grant network access to a Mobile Station.

A method of operating a base station subsystem, comprises the steps of allocating radio frequency resources; and contemporaneously, allocating packet session resources.

A method of operating a wireless network, comprises the steps of establishing an A10 interface; allocating Packet Control Function resources for a packet data session in response to establishing the A10 interface; and connecting the PCF resources for the packet data session in response to allocating the PCF resources.

A method of operating a wireless network, comprises the steps of establishing an A10 interface; performing a channel assignment process; and initiating a service connection request in response to establishing the A10 interface and in response to performing the channel assignment process.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 2:
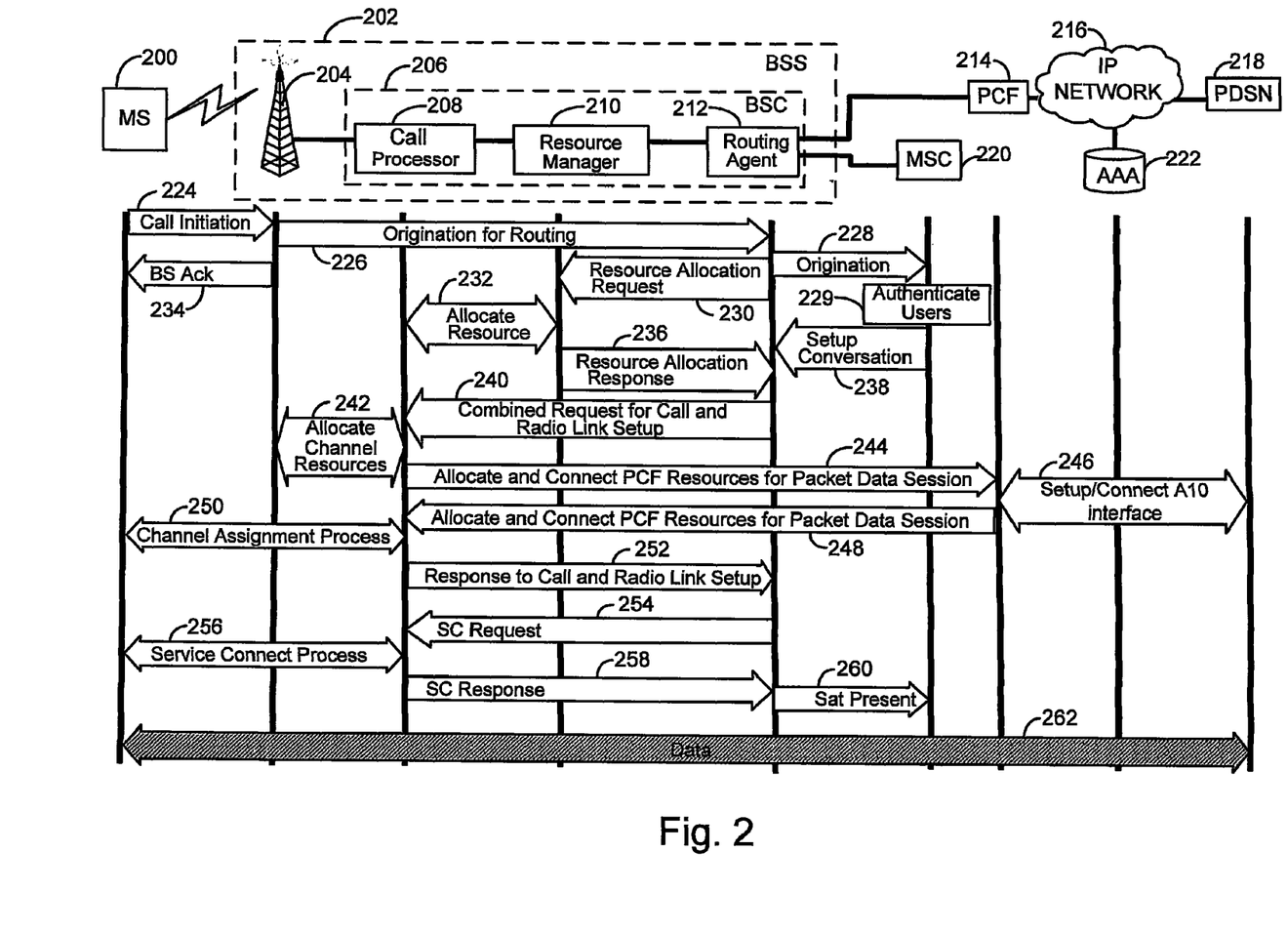
FIG. 2 displays a message process flow diagram implemented in accordance with the teachings of the present invention.

FIG. 2 displays a message process flow diagram detailing the method and apparatus of the present invention. In one embodiment, the method and apparatus presented may be implemented to establish a packet data call communication circuit for specific delay-sensitive applications, such as PTT, VoIP, etc. In one embodiment, delay-sensitive applications include applications that require end-to-end communication within a certain time to properly operate the application. In accordance with the teachings of the present invention, the call setup time in a packet network is decreased by performing contemporaneous process execution within a BSS for delay-sensitive packet-based applications, such as PTT and VoIP. In one embodiment, contemporaneous process steps include those process steps that are performed simultaneously, relatively simultaneously when compared with the time on other process steps and/or within the same time period when compared with the time period of other steps.

In FIG. 2, a Mobile Station (MS) 200 is shown. The MS 200 is in communication with a Base Station Subsystem (BSS) 202. The BSS 202 includes a Base Transceiver Station (BTS) 204 that is in communication with a Base Station Controller (BSC) 206. The BSC 206 also includes a Call Processor (CP) 208, a Resource Manager (RM) 210, and a Routing Agent (RA) 212. The RA 212 is in communication with an MSC 220 and a Packet Control Function (PCF) 214. The BSC 206 communicates with a Mobile Switching Center (MSC) 220 and a PCF 214. The PCF 214 is in communication with an IP network 216. An Authentication, Authorization, and Accounting (AAA) server 222 may be accessed through the IP network 216. A PDSN 218 is also in communication with the IP Network 216. It should be appreciated that, in alternate embodiments, the Packet Control Function (PCF) 214 and the PDSN 218 may each function as part of the BSS 202.

In one embodiment, the RM 210 is primarily responsible for allocating resources, such as selecting the appropriate CP 208, memory resources, etc., within the BSC 206. In one embodiment, the RA 212 is a functional entity within the BSC 206 that is responsible for routing messages within the BSS 202.

In one embodiment of the present invention, messages are sent from the MS 200 to the PDSN 218 to establish a communication path for data transmission. The messages and architectures discussed in the instant application are defined in various wireless standards. Among these standards are 3GPP2 Access Network Interfaces Interoperability Specification, A.S0002-A Version 2.0, 3GPP2, June 2002 and Interoperability Specification (IOS) for cdma2000 Access Network Interfaces Part 7-A20 and A22 Interfaces, 3G-IOSv4.3, 3GGP2 A.S0027-A, Version 2.0.2, July 2003, which are both incorporated by reference.

The MS 200 sends a call setup initiation message 224, such as an origination message, a page response message, a reconnect message, etc., to the BTS 204. The BTS 204 forwards the call setup initiation message 226 to the RA 212. The BTS 204 sends a base station acknowledgement message (BS Ack) 234 to the MS 200 indicating that the call setup initiation message 224 has been received.

Upon receiving the call setup initiation message 226, the RA 212 identifies the call as a packet data call for a specific packet-based application, such as PTT application, VoIP application, push-to-media, instant messaging, etc., that requires special treatment. In accordance with the teachings of the present invention, the RA 212 performs the following two tasks:

a) The RA 212 forwards the call setup origination message 228 to the MSC 220 for further processing, such as authentication shown as 229, retrieval of user's profile etc.;

b) The RA 212 communicates a resource allocation request 230 to request that the RM 210 allocates all of the resources needed within the BSC 206 to complete the call setup process; the RM 210 communicates with the CP 208 to allocate resources 232; the RM 210 communicates a resource allocation response 236 to the RA 212.

The RM 210 allocates the appropriate CP 208 resources and communicates an allocate resource message 232 to inform the selected CP 208 module that it has been selected for processing this particular call setup message for the packet-based applications (i.e., such as PTT and VoIP). The MSC 220 replies to the origination message 228 with a setup conversation message 238 that may include the MS's 200 profile, such as Supplemental Channel (SCH) capability, Short Data Burst (SDB), supported bit, etc. RM 210 communicates a resource allocation response 236 to inform the RA 212 that the appropriate CP 208 module and the other necessary resources within the BSC 206 have been allocated. In one embodiment, the RM 210 provides the identity, such as an IP (Internet Protocol) address of the CP 208 module to the RA 212. In another embodiment, the RM 210 also provides the software record number of a CP 208 element to the RA 212.

The RA 212 identifies the call as a packet data call for specific packet-based applications (such as PTT and VoIP). It, therefore, combines the functions of call setup and radio link setup into a single message before forwarding it to the CP 208. Using a combined message (i.e., combined request for call and radio link setup 240), the CP 208 performs all the necessary tasks needed to setup the call as well as setup the radio link between the MS 200 and the BSS 202. In this way, the messages between the RA 212 and the CP 208 are minimized to a single message as opposed to multiple messages. In one embodiment, the combined message may include parameters, such as the Quality of Service (QoS) priority, the SDB bit, etc. Upon receiving the combined request for call and radio link setup 240, the CP 208 may perform the following two functions (among other things):

a) Using an allocate channel resources message 242, the CP 208 requests the BTS 204 to allocate the radio link related resources. Radio link related resources include the resources necessary to establish, operate, and terminate a radio link. In a first embodiment, the radio related resources may include a Channel Element (CE), Fundamental Channel (FCH), a FCH Walsh Code, a radio frequency channel, a packet scheduler, a frame processor, a code (such as long code mask, Walsh code etc.) generator, a code (such as long code mask, Walsh code etc.) distributor, radio frequency transmitter, and radio frequency receiver. In addition, the radio link-related resources may include, but are not limited to, the following: hardware and software entities within the BTS 204, BSC 206, and PCF 214 that process a packet-based session; software manager (such as PCF manager) to manage such resources; software binding cache to create and maintain co-relationship (also known as software 'binding') between the user's radio-related address, such as International Mobile Subscriber Identity (IMSI), Mobile Identification Number (MIN), Mobile Equipment ID (MEID), etc.; the user's packet-related address, such as IP address, Network Access Identifier (NAI), Ethernet address, etc.; software session manager to create and maintain the packet session ID, packet session state, R-P session information, etc.; and mobility manager to maintain the mobility information in the packet domain. The CP 208 may also send null frames on the forward FCH as a part of allocating radio link related resources;

b) The CP 208 sends a message (i.e., allocate and connect PCF resources for packet data session message 244) to the PCF 214 to request that the PCF 214 allocate appropriate resources (i.e., packet resources) to setup this packet data call for specific packet-based applications (such as PTT and VoIP). Packet resources include the resources necessary to establish, operate, and terminate a packet link. In one embodiment, the packet resources include hardware and software entities within the BSC 206 and PCF 214 to process a packet-based session; software manager (such as PCF manager) to manage such resources; software binding cache to create and maintain co-relationship (also known as software 'binding') between the user's radio-related address, such as International Mobile Subscriber Identity (IMSI), Mobile Identification Number (MIN), Mobile Equipment ID (MEID), etc.; the user's packet-related address, such as IP address, Network Access Identifier (NAI), Ethernet address, etc.; software session manager to create and maintain the packet session ID, packet session state, R-P session information, etc.; and mobility manager to maintain the mobility information in the packet domain. In one embodiment, the allocated and connected PCF resources for packet data session message 244 may include the transition identification (i.e., to indicate whether the MS 200 is transitioning from Null to Active or Dormant to Active, and/or the MS's 200 International Mobile Subscriber Identity (IMSI)).

The PCF 214 allocates the appropriate resources necessary to setup the packet data call for specific packet-based applications (such as PTT and VoIP). The PCF 214 resources may include a block of Read Only Memory, a packet session identification (SID), a Port identification (PID), etc. The PCF 214 may then send an A11-Resigtration Request message to the PDSN 218 to set up (or re-connect) an A10 interface as shown by 246 to serve specific packet-based applications (such as PTT and VOIP). The PCF 214 may also create a proprietary A10 interface between the PCF 214 and the PDSN 218.

The PCF 214 communicates allocate and connect PCF resources for packet data session message 248 to the CP 208 to inform the CP 208 that the appropriate resources as well as the A10 interface have been allocated (or connected) to setup this packet data for specific packet-based applications (such as PTT and VoIP). The CP 208 communicates with the MS 200, shown with the channel assignment process 250 to complete the channel assignment process between the MS 200 and the BSS 202. In accordance with the teachings of the present invention, in one embodiment, the channel assignment process 250 may continue simultaneously while the steps of allocate and connect PCF resources for packet data session 244, setup/connect A10 interface 246, and allocate and connect PCF resources for packet data session 248 are being performed. In one embodiment, the channel assignment process 250 may include the CP 208 sending Extended Channel Assignment Message (ECAM) to MS 200 on a paging channel, the assigned CE acquiring reverse FCH, the BTS receiving traffic channel preamble from the MS 200, the CP 208 receiving null traffic data from the MS 200, the CP 208 sending BS Ack message 234 to the MS 200, the MS 200 sending MS Acknowledgement (MS Ack) 234 message to the CP 208, the CP 208 sending Status Request message to the MS 200 and the MS 200 sending Status Response message to the CP 208, etc.

The CP 208 communicates a response to call and radio link setup 252 to inform the RA 212 that the channel has been successfully setup for this packet data call for serving specific applications (such as PTT and VOIP). The RA 212 communicates a Service Connection (SC) request 254 to request that the CP 208 sends a service connect message to the MS 200. In one embodiment, the SC request 254 includes the user's zone ID, the user's network ID, and other location-related information.

The CP 208 completes the service connect process as shown by 256. In one embodiment, completing the service connection process 256 includes sending a service connect message to the MS 200 and then receiving a service connect complete message from the MS 200. The service connect message informs the MS 200 that the call has been setup to serve specific applications (such as PTT and VOIP). In one embodiment, parameters, such as the multiplexing option, coding type, interleaving type, and allowed radio configuration, etc., may be included in the service connect message.

As shown by the SC response 258, the CP 208 informs the RA 212 that the MS 200 has been granted access to the BSS 202 to serve specific packet-based applications (such as PTT and VOIP). In one embodiment, the CP 208 informs the RA 212 about MS's 200 SCH capabilities, SDB supported bit, the PCF 214 address, etc. In another embodiment, the SC request 254, the service connect process 256, and SC response 258 can all be omitted to reduce the call setup time. This is done based on the network's knowledge that the user is currently in the process of launching specific packet-based applications (such as PTT and VoIP).

The RA 212 sends a Sat present message 260 to the MSC 220 informing the MSC 220 that the MS 200 has been allowed in the network, that is, a traffic channel has been allocated to the MS 200. In one embodiment, the Sat present message 260 may also inform the MSC 220 of the MS 200 SCH capabilities, SDB supported bits, etc.

The MS 200 may now launch the specific packet-based applications illustrated by the data 262. The MS 200 may also establish Radio Link Protocol (RLP) and Point-To-Point (PPP) sessions (not shown in the figure) before launching the specific packet-based applications.

Figure 3:
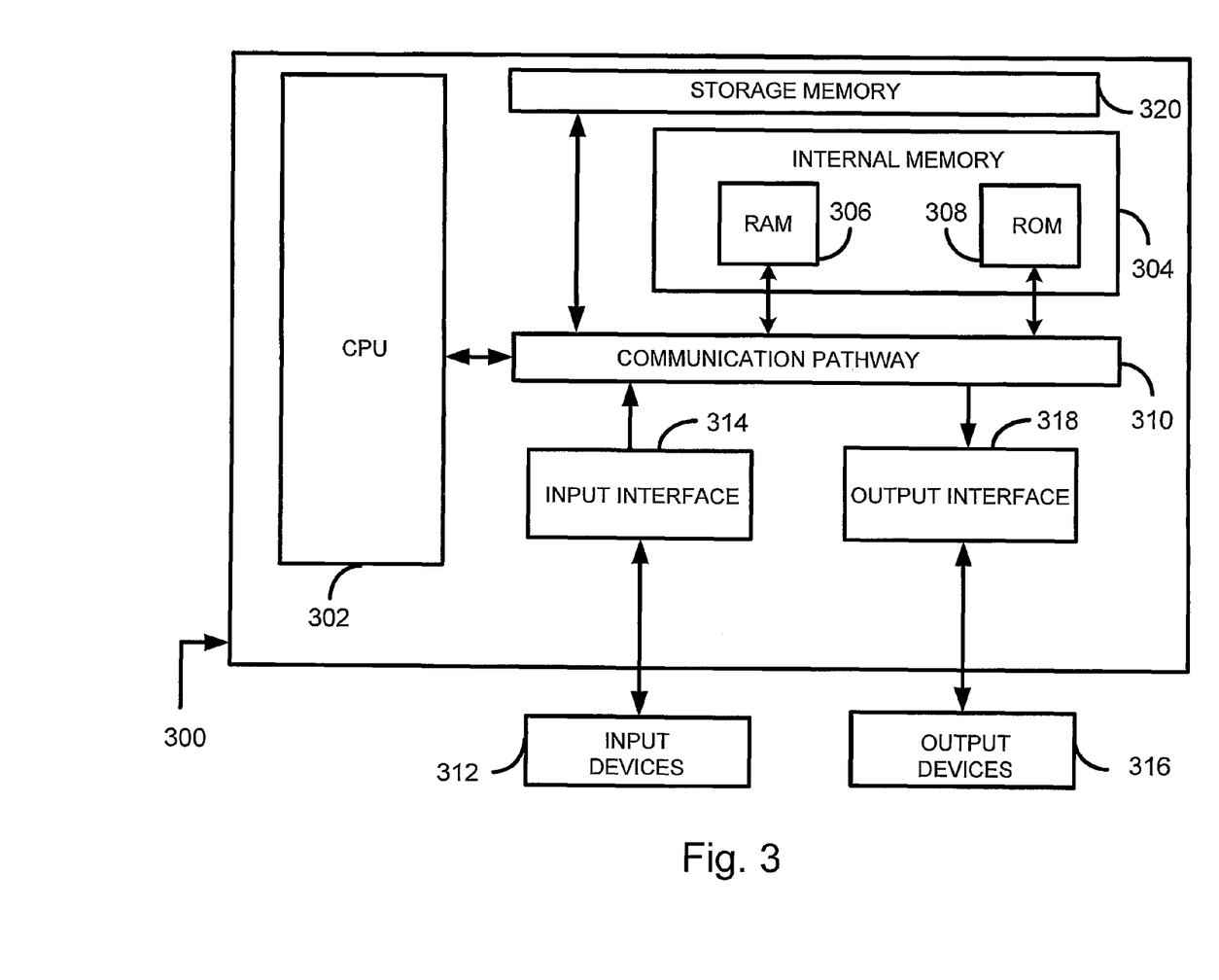
FIG. 3 displays a computer architecture implementing the teachings of the present invention.

FIG. 3 displays a computer architecture implementing the teachings of the present invention. The computer 300 may be used to implement the MS 200, the BSC 206, the CP 208, the RM 210, the RA 212, MSC 220, PCF 214, IP Network 216, AAA 222, and the PDSN 218 of FIG. 2. A central processing unit (CPU) 302 functions as the brain of the computer 300. Internal memory 304 is shown. The internal memory 304 includes short-term memory 306 and long-term memory 308. The short-term memory 306 may be a Random Access Memory (RAM) or a memory cache used for staging information. The long-term memory 308 may be a Read Only Memory (ROM) or an alternative form of memory used for storing information. Storage memory 320 may be any memory residing within the computer 300 other than internal memory 304. In one embodiment of the present invention, storage memory 320 is implemented with a hard drive. A communication pathway 310 is used to communicate information within computer 300. In addition, the communication pathway 310 may be connected to interfaces, which communicate information out of the computer 300 or receive information into the computer 300.

Input devices, such as tactile input device, joystick, keyboards, microphone, communications connections, or a mouse, are shown as 312. The input devices 312 interface with computer 300 through an input interface 314. Output devices, such as a monitor, speakers, communications connections, etc., are shown as 316. The output devices 316 communicate with computer 300 through an output interface 318.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of operating a base station subsystem, the method comprising:
   processing a call initiation request for a call from a mobile station;
   identifying a call from a mobile station as a packet data call for specific packet-based applications;
   in response to the identification of the call as a packet data call for specific packet-based applications, generating a setup request message for delivery from a routing agent within the base station subsystem to a call processor within the base station subsystem, the setup request message comprising a call setup request and a radio link setup request; and
   in response to receiving the request message,
      initiating setup of the call, the setup initiation comprising transmitting a message to a packet control function operable for allocating packet data resources to establish a packet data session for the call, and
      contemporaneously with the call setup initiation, allocating radio link related resources to establish a radio link between the mobile station and the base station subsystem for the call.

2. A method of operating a base station subsystem, as set forth in claim 1, wherein the call initiation request is at least a one of an origination request, a page response message or a reconnect message.

3. A method of operating a base station subsystem, as set forth in claim 1, wherein the specific packet-based applications is a one of a voice-over-IP (VoIP) application or a push-to-talk (PTT) application.

4. A method of operating a base station subsystem, as set forth in claim 1, wherein the specific packet-based applications is a one of a push-to-media application or an instant messaging application.

5. A method of operating a base station subsystem, as set forth in claim 1, wherein the resources are hardware resources.

6. A method of operating a base station subsystem, as set forth in claim 1, wherein the resources are software resources.

7. A method of operating a base station subsystem, as set forth in claim 1, wherein processing the call initiation request and contemporaneously allocating resources within the base station subsystem is performed in a routing agent.

8. A method of operating a base station subsystem, as set forth in claim 1, wherein the resources further comprise resource manager resources.

9. A method of operating a base station subsystem, as set forth in claim 1, wherein the resources include call processing resources.

10. A method of operating a base station subsystem, as set forth in claim 1, wherein contemporaneously allocating resources is performed during a user authentication process.

11. A method of operating a base station subsystem, as set forth in claim 1, wherein the specific packet-based applications are delay-sensitive applications.

12. A method of operating a base station subsystem, the method comprising:
   receiving a call initiation request for a call from a mobile station;
   identifying the call as a packet data call for specific packet-based applications;

in response to identifying the call, generating a setup request message comprising a call setup request and a radio link setup request; and in response to receiving the setup request message, allocating radio frequency resources for the call, and contemporaneously with allocating radio frequency resources, allocating packet session resources for the call.

13. A method of operating a base station subsystem, as set forth in claim 12, wherein a routing agent initiates the allocating radio frequency resources.

14. A method of operating a base station subsystem, as set forth in claim 12, wherein a call processing agent initiates the allocating packet resources.

15. A method of operating a wireless network, the method comprising:

receiving a call initiation request for a call from a mobile station;

identifying the call as a packet data call for specific packet-based applications;

in response to identifying the call, generating a setup request message comprising a call setup request and a radio link setup request; and in response to receiving the setup request message, performing a Packet Control Function (PCF) allocation and connection process, comprising allocating PCF resources for a packet data, establishing an A10 interface between a PCF and a Packet Data Service Node (PDSN), and connecting the PCF resources for the packet data session in response to allocating the PCF resources; and, contemporaneously with performing the PCF allocation and connection process, performing a channel assignment process between the mobile station and a base station subsystem.

16. A method of operating a wireless network, as set forth in claim 15, wherein a PCF performs the allocating PCF resources.

17. A method of operating a wireless network as set forth in claim 15, wherein the specific packet-based applications is a one of a voice-over-IP (VoIP) application or a push-to-talk (PTT) application.

18. A method of operating a wireless network, the method comprising:

receiving a call initiation request for a call from a mobile station;

identifying the call as a packet data call for specific packet-based applications;

in response to identifying the call, generating a setup request message comprising a call setup request and a radio link setup request; and in response to receiving the setup request, performing a Packet Control Function (PCF) allocation and connection process, comprising allocating and connecting PCF resources for a packet data session, and establishing an A10 interface between a PCF and a Packet Data Service Node (PDSN), contemporaneously with the PCF allocation and connection process, performing a channel assignment process, and initiating a service connection request in response to establishing the A10 interface and in response to performing the channel assignment process.

19. A method of operating a wireless network, as set forth in claim 18, wherein the specific packet-based applications is a one of a voice-over-IP (VoIP) application or a push-to-talk (PTT) application.

20. A method of operating a wireless network, as set forth in claim 18, wherein the channel assignment process is performed between a call processor and the mobile station.

21. A method of operating a wireless network, as set forth in claim 18, wherein the service connection request is generated by a routing agent.

* * * * *

UNITED STATES PATENT AND TRADEMARK OFFICE
CERTIFICATE OF CORRECTION

PATENT NO. : 7,948,937 B2  Page 1 of 1
APPLICATION NO. : 10/590920
DATED : May 24, 2011
INVENTOR(S) : Akhtar et al.

It is certified that error appears in the above-identified patent and that said Letters Patent is hereby corrected as shown below:

On the Title Page, Item (57), under "ABSTRACT", Line 8, delete "Link" and insert -- link --, therefor.

In Fig. 1B, Sheet 2 of 4, for Tag "158", Line 1, delete "Connet" and insert -- Connect --, therefor.

In Column 5, Line 27, delete "perfonn" and insert -- perform --, therefor.

In Column 7, Line 29, delete "(PPP)" and insert -- (PTP) --, therefor.

In Column 9, Line 37, in Claim 16, after "performs" delete "the".

In Column 10, Line 1, in Claim 17, delete "network as" and insert -- network, as --, therefor.

Signed and Sealed this
Twentieth Day of March, 2012

David J. Kappos
*Director of the United States Patent and Trademark Office*